(12) United States Patent
Baba et al.

(10) Patent No.: US 9,354,352 B2
(45) Date of Patent: May 31, 2016

(54) PHOTOELECTRIC SENSOR

(71) Applicant: Keyence Corporation, Osaka (JP)

(72) Inventors: Jiro Baba, Osaka (JP); Tomoki Hanada, Osaka (JP)

(73) Assignee: Keyence Corporation, Osaka (JP)

( * ) Notice: Subject to any disclaimer, the term of this patent is extended or adjusted under 35 U.S.C. 154(b) by 100 days.

(21) Appl. No.: 14/479,443

(22) Filed: Sep. 8, 2014

(65) Prior Publication Data

US 2015/0102205 A1 Apr. 16, 2015

(30) Foreign Application Priority Data

Oct. 11, 2013 (JP) ................................. 2013-213482

(51) Int. Cl.
*G01V 8/12* (2006.01)
*G01J 1/44* (2006.01)
*G01J 1/46* (2006.01)

(52) U.S. Cl.
CPC ... *G01V 8/12* (2013.01); *G01J 1/44* (2013.01); *G01J 1/46* (2013.01)

(58) Field of Classification Search
CPC ................. G01V 8/12; G01J 1/44; G01J 1/46
USPC .................................. 250/206; 702/66, 176
See application file for complete search history.

(56) References Cited

U.S. PATENT DOCUMENTS

| | | | |
|---|---|---|---|
| 4,755,951 A | * | 7/1988 | Hollister ................ H03K 5/135 327/307 |
| 6,587,811 B2 | | 7/2003 | Schleifer et al. |
| 6,665,621 B2 | | 12/2003 | Drinkard et al. |
| 8,600,656 B2 | * | 12/2013 | Mimeault ............ B60Q 1/0023 340/435 |
| 8,908,159 B2 | * | 12/2014 | Mimeault ................ G01C 3/08 356/5.04 |

FOREIGN PATENT DOCUMENTS

| | | |
|---|---|---|
| JP | H08-075855 | 3/1996 |
| JP | H08-086872 | 4/1996 |

\* cited by examiner

*Primary Examiner* — Seung C Sohn
(74) *Attorney, Agent, or Firm* — Kilyk & Bowersox, P.L.L.C.

(57) ABSTRACT

Provided is a photoelectric sensor that detects a workpiece by measuring light transmission time. A photoelectric sensor includes: a light emitting element which repeatedly generates detection light; a light receiving element which receives reflected light of the detection light; a binarization processing section which binarizes a light receiving signal; a waveform detection section which detects waveform data indicating a temporal change of the binarized light receiving signal; a waveform integration section which matches light emitting timing of the light receiving element to integrate two or more pieces of waveform data and generates integrated waveform data; and a workpiece discrimination section which discriminates presence or absence of a workpiece based on the integrated waveform data, whereby the reflected light is sampled at a high speed while a circuit scale is suppressed, to detect the workpiece.

5 Claims, 11 Drawing Sheets

WHEN WORKPIECE IS PRESENT

FIG. 2B

WHEN WORKPIECE IS NOT PRESENT

PHOTOELECTRIC SENSOR

CROSS-REFERENCE TO RELATED APPLICATIONS

The present application claims foreign priority based on Japanese Patent Application No. 2013-213482, filed Oct. 11, 2013, the contents of which is incorporated herein by reference.

BACKGROUND OF THE INVENTION

1. Field of the Invention

The present invention relates to a photoelectric sensor, and more specifically relates to improvement in a photoelectric sensor that emits detection light and receives its reflected light, to thereby detect a workpiece.

2. Description of Related Art

There is conventionally known a photoelectric sensor that emits detection light to a predetermined detection position and receives its reflected light, to thereby detect presence or absence of a workpiece. As this kind of photoelectric sensors, there are known are a type which uses a difference in light receiving amount due to the presence or absence of the workpiece, and a type which uses triangulation. In the case of the type of the photoelectric sensor which uses triangulation, a distance to a reflection surface is measured by triangulation and the distance is compared with a threshold, to detect the presence or absence of the workpiece.

The distance to the reflection surface can also be obtained by measuring light transmission time. In other words, it is considered that, when time from emission of the detection light to reception of the reflected light can be measured, the distance to the reflection surface can be obtained and the workpiece can be detected without using triangulation.

However, when the workpiece is to be detected by measuring the light transmission time in the photoelectric sensor, the reflected light needs to be sampled in an extremely short period, which has been problematic. A speed of light is $3.0 \times 10^8$ m/s, and the light travels 30 mm in 100 ps. Therefore, for example, when a distance to the workpiece is to be detected with an accuracy of 15 mm, it is necessary to sample the reflected light by an order of 100 ps.

Sampling the reflected light at such a speed is not easy, and in order to achieve this, countermeasures for heat generation is required, which is considered to increase the size of the device as a whole.

SUMMARY OF THE INVENTION

The present invention has been made in view of the above situations, and an object thereof is to provide a photoelectric sensor that detects a workpiece by measuring light transmission time. In particular, an object thereof is to provide such a photoelectric sensor at a low price. Further, an object thereof is to reduce a size of such a photoelectric sensor. Moreover, an object thereof is to improve reliability of the photoelectric sensor.

According to one embodiment of the present invention, a photoelectric sensor includes: a light emitting element which repeatedly generates detection light; a light receiving element which receives reflected light of the detection light and generates a light receiving signal indicating a light receiving amount; a binarization processing section which binarizes the light receiving signal from the light receiving element; a capturing control circuit which generates a capturing signal corresponding to light emitting timing of the light emitting element; a waveform capturing section which has a large number of storage elements, each of the storage elements storing the binarized light receiving signal in accordance with the capturing signal; a capturing signal distribution section which has a branch circuit for supplying the capturing signal to each of the storage element; a light receiving signal distribution section which has a branch circuit for supplying the binarized light receiving signal to each of the storage elements; a delay circuit which is provided in at least one of the capturing signal distribution section and the light receiving signal distribution section, and relatively delays timing of supply of the capturing signal and the binarized light receiving signal to each of the storage elements such that the binarized light receiving signal is stored into the waveform capturing section as waveform data indicating a temporal change; a waveform integration part which matches light emitting timing of the light receiving element to integrate two or more pieces of the waveform data and generates integrated waveform data; and a workpiece discrimination part which discriminates presence or absence of a workpiece based on the integrated waveform data.

By detecting the binarized light receiving signal as the waveform data indicating a temporal change, it is possible to significantly reduce a circuit scale and perform sampling at a higher speed as compared to the case of sampling a light receiving signal as multiple value data. Further, by performing sampling with delay time of the delay circuit taken as a sampling period, it is possible to perform sampling at a higher speed. Moreover, by repeatedly emitting the detection light and obtaining the integrated waveform data obtained by integrating two or more pieces of waveform data, it is possible to suppress a noise component and emphasize a reflected light component. Hence it is possible to sample the reflected light at a high speed while suppressing the circuit scale, so as to detect the workpiece.

According to another embodiment of the present invention, in addition to the above configuration, the photoelectric sensor further includes a peak detection part which detects a peak of the integrated waveform data and obtains a distance to a reflection surface of the reflected light, wherein the workpiece discrimination part compares the distance with a determination threshold and discriminates the presence or absence of the workpiece.

By detecting the peak of the integrated waveform data and obtaining the distance to the reflection surface, it is possible to measure the distance to the reflection surface with high accuracy. Further, it is possible to suppress an influence by noise and perform highly reliable detection of the workpiece.

According to still another embodiment of the present invention, in addition to the above configuration, the light receiving signal distribution section is provided with a delay line which includes a large number of the delay circuits connected in series, and into which the binarized light receiving signal is inputted.

According to still another embodiment of the present invention, in addition to the above configuration, the delay circuit has a first delay element and a second delay element which are connected in series, and a capacitance element, an output terminal of the first delay element is connected to the second delay element and the capacitance element, an output terminal of the second delay element is connected to the storage element and the post-stage delay circuit, and the capacitance element has a capacitance substantially equal to an input capacitance of the storage element.

With such a configuration, it is possible to substantially match load capacitances of the two delay elements, and substantially match rising characteristic and falling characteristic of the delay circuit. Hence, it is possible to acquire highly accurate waveform data.

According to still another embodiment of the present invention, in addition to the above configuration, in the capturing signal distribution section, the number of branches, through which the capturing signal passes before being inputted into the storage element, monotonously increases as a light receiving time of the light receiving amount captured by the storage element becomes earlier.

With such a configuration, a delay inside the capturing signal distribution section can prevent occurrence of missing data in the waveform data.

According to the present invention, it is possible to provide a photoelectric sensor that detects a workpiece by measuring light transmission time. In particular, it is possible to provide such a photoelectric sensor at a low price. Further, it is possible to reduce a size of such a photoelectric sensor. Moreover, it is possible to improve the reliability of the photoelectric sensor.

DETAILED DESCRIPTION OF PREFERRED EMBODIMENTS

First Embodiment

Figure 1:
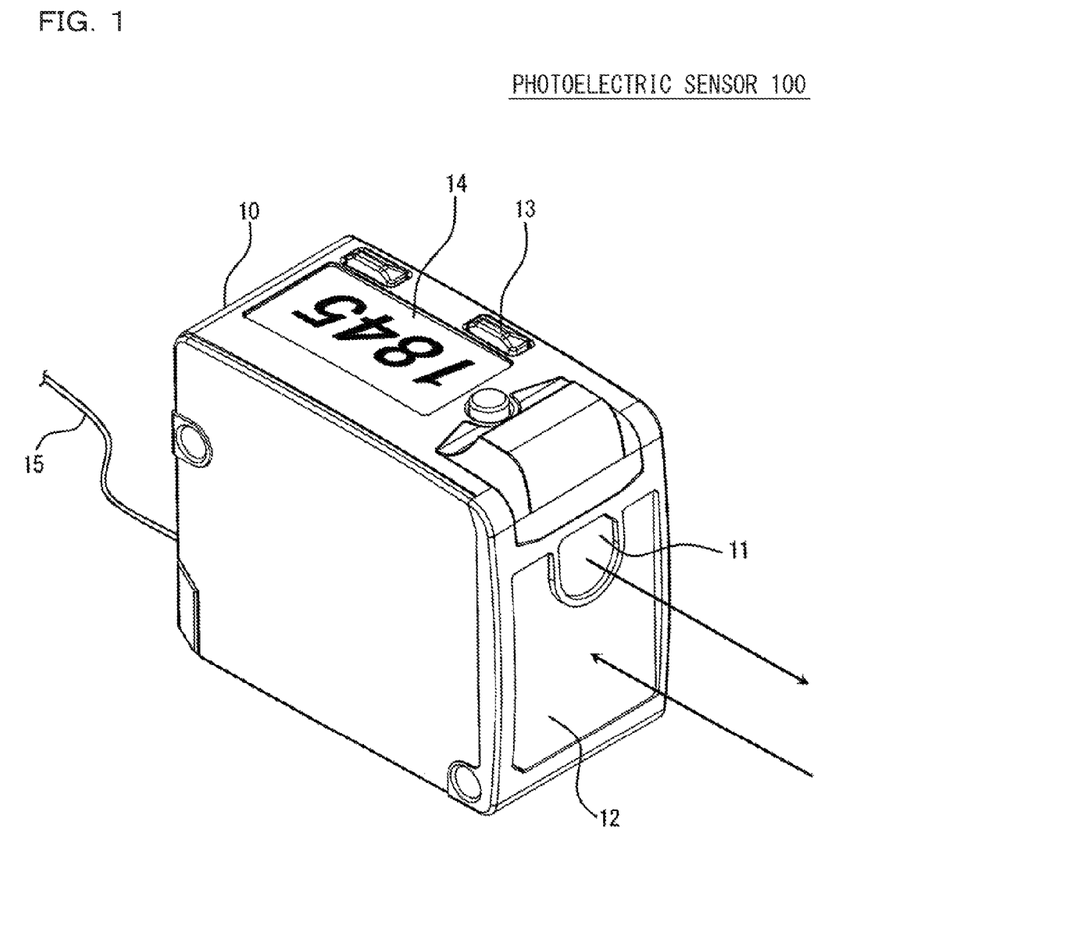
FIG. 1 is an external view showing one configuration example of a photoelectric sensor 100 according to a first embodiment of the present invention.

FIG. 1 is an external view showing one configuration example of a photoelectric sensor 100 according to a first embodiment of the present invention. The photoelectric sensor 100 is configured by a substantially parallelepiped casing 10 with a depth direction taken as longitudinal, and its front surface is provided with a light projection window 11 for emitting detection light and a light receiving window 12 on which reflected light of the detection light is incident. Further, the side surface of the casing 10 is provided with an operation key 13 for a user to perform an operation input and a display section 14 for performing a display output. Moreover, the rear surface of the casing 10 is provided with a communication cable 15 connected to another device (not shown).

This photoelectric sensor 100 measures time from emission of the detection light to reception of the reflected light, to thereby detect presence or absence of a workpiece. This measured time corresponds to a reciprocal distance to the reflection surface. Therefore, by comparing the measured time with a previously set determination threshold Vj, it is possible to determine the presence or absence of the workpiece at a previously set detection position. This determination result is outputted to the display section 14, or outputted to another device via the communication cable 15.

Figure 2A:
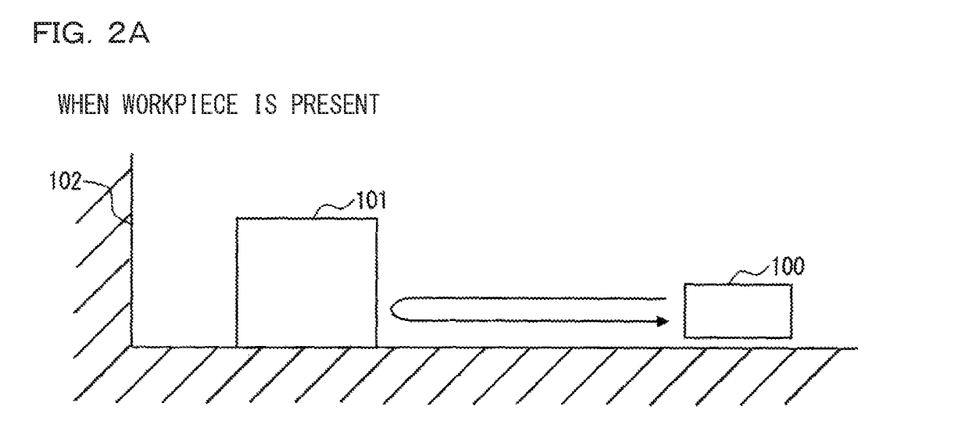
FIGS. 2A and 2B are diagrams each showing one example of a state at the time of detecting a workpiece by the photoelectric sensor 100.
Figure 2B:
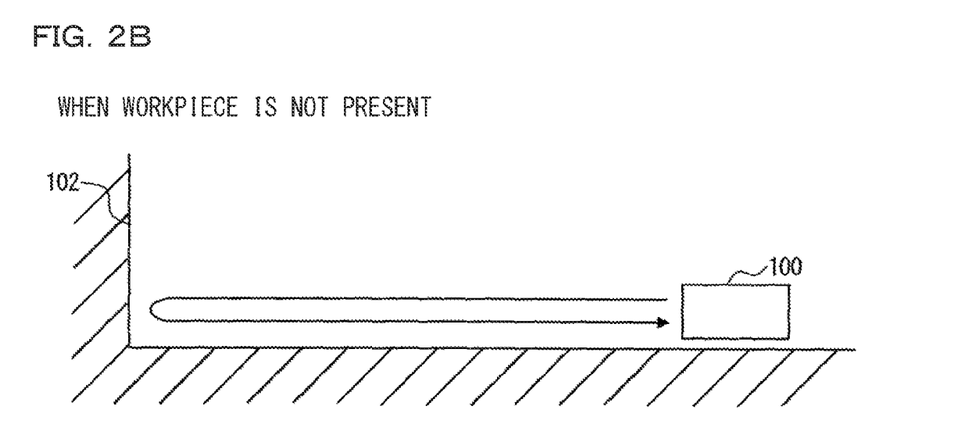

FIGS. 2A and 2B are diagrams each showing one example of a state at the time of detecting the workpiece by the photoelectric sensor 100. FIG. 2A shows a case where a workpiece 101 as a detection target is present, and FIG. 2B shows a case where the workpiece 101 is not present.

When the workpiece 101 is present, detection light from the photoelectric sensor 100 is reflected on the workpiece 101 and a wall surface 102, and each reflected light is incident on the photoelectric sensor 100. In contrast, when the workpiece 101 is not present, only light reflected on the wall surface 102 is incident on the photoelectric sensor 100. Hence, the presence or absence of the workpiece can be detected by obtaining a distance to the reflection surface and comparing the obtained distance with the determination threshold Vj.

Figure 3:
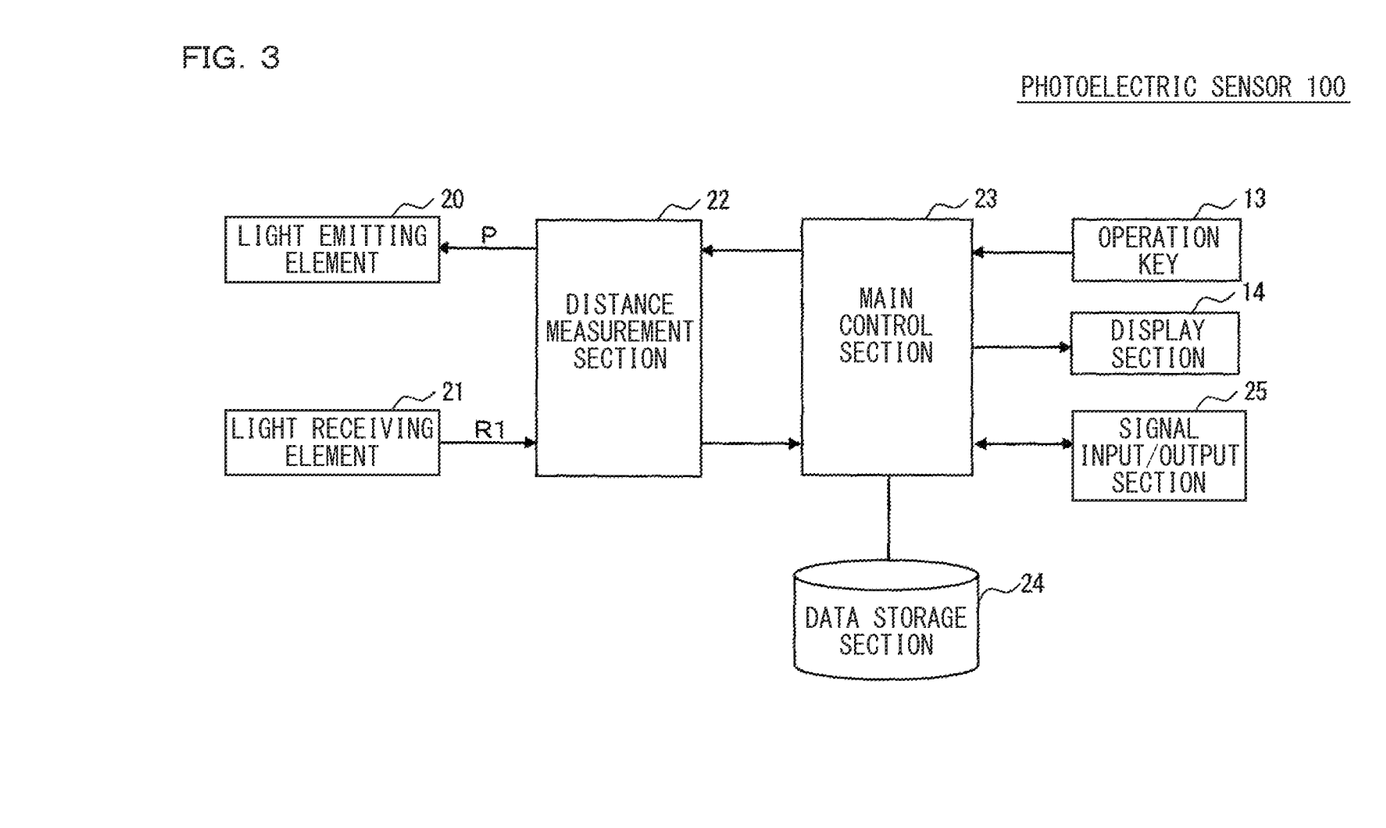
FIG. 3 is a diagram showing one example of a circuit configuration of the photoelectric sensor 100 in FIG. 1.

FIG. 3 is a diagram showing one example of a circuit configuration of the photoelectric sensor 100 in FIG. 1. The photoelectric sensor 100 is configured by the operation key 13, the display section 14, a light emitting element 20, a light receiving element 21, a distance measurement section 22, a main control section 23, a data storage section 24, and a signal input/output section 25.

The operation key 13 is an operation input part which outputs an operation signal to the main control section 23 based on a user's operation, and for example, a contact-type switch is used. By pressing the operation key 13, the user can change a variety of parameters including the determination threshold Vj, or can instruct a start of a detection operation, and the like. The display section 14 is a display which displays a parameter setting screen and a workpiece determination result based on a display signal from the main control section 23, and for example, a liquid crystal panel or an organic EL is used.

The light emitting element 20 is a semiconductor element which generates detection light based on a light emitting signal P from the distance measurement section 22, and for example, a laser diode for generating red laser light is used. The light emitting signal P is a pulse signal that drives the light emitting element 20, and based on this pulse signal, pulse-like detection light is generated from the light emitting element 20. That is, light emitting timing of the light emitting element 20 is specified by the light emitting signal P.

The light receiving element 21 is a semiconductor element which receives reflected light of the detection light and generates a light receiving signal R1 that indicates an amount of the received light, and for example, a photodiode is used. The generated light receiving signal R1 is outputted to the distance measurement section 22.

The distance measurement section 22 is a part which measures time from emission of the detection light by the light emitting element 20 to reception of the reflected light by the light receiving element 21, to thereby obtain a distance to the reflection surface. The distance measurement section 22 is required to be operated at a high speed and hence, for example, a dedicated semiconductor integrated device is used.

The main control section 23 is a control part which controls each component in the photoelectric sensor 100, and for example, a microprocessor is used. The data storage section 24 is a storage part which stores setting data including a determination threshold, and for example, a flash memory is used. Based on the operation signal from the operation key 13, the main control section 23 changes a variety of parameters including the determination threshold which are held in the data storage section 24. Further, the main control section 23 controls the measurement operation by the distance measurement section 22 and compares the distance to the reflection surface measured by the distance measurement section 22 with the determination threshold, to determine the presence or absence of the workpiece.

The signal input/output section 25 is a communication part which performs communications with another device (not shown) via the communication cable 15. The signal input/output section 25 receives a control signal from another device, or transmits a determination result to another device.

Figure 4:
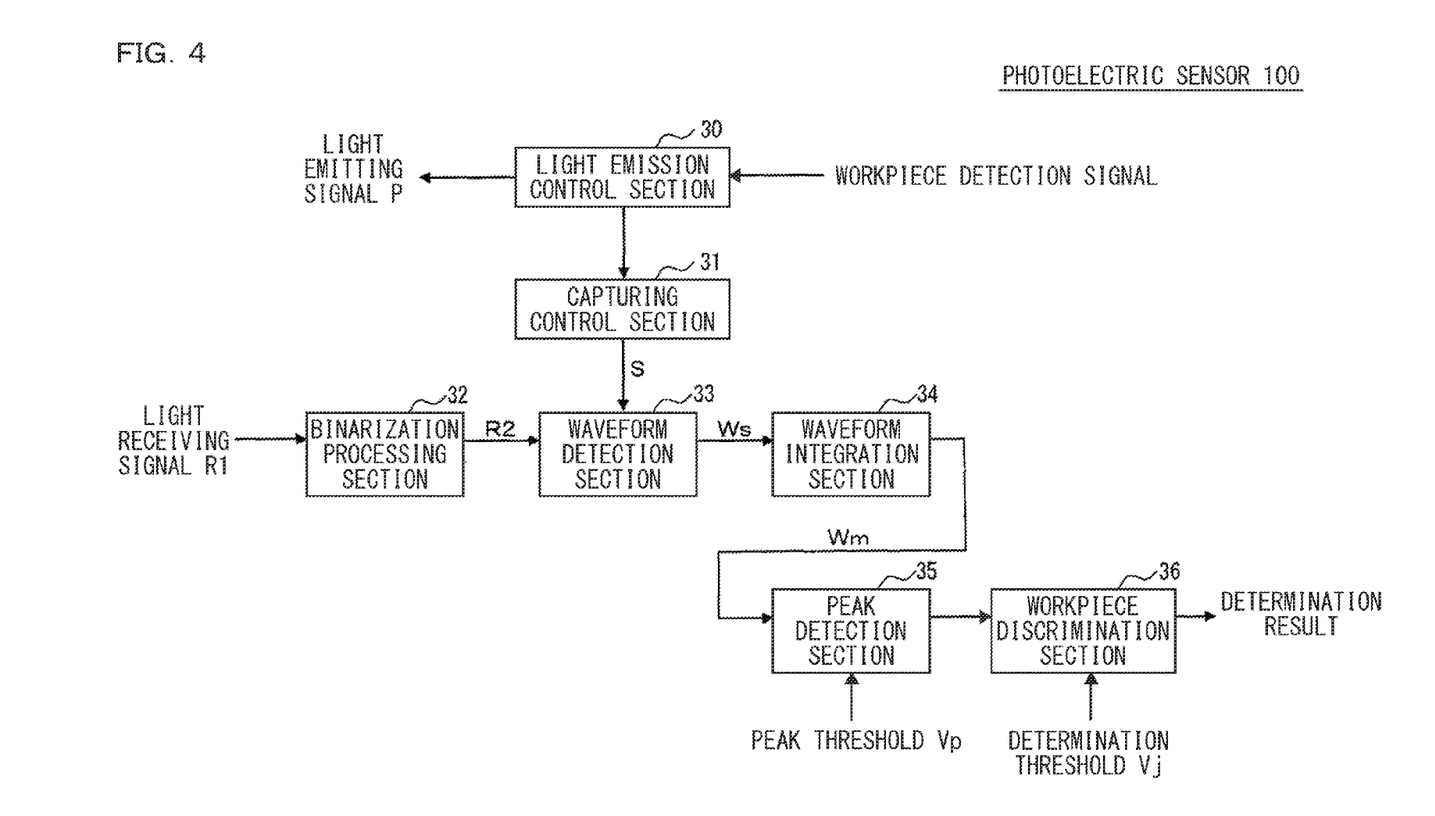
FIG. 4 is a block diagram showing one example of a function configuration of a main part of the photoelectric sensor 100 in FIG. 1.

FIG. 4 is a block diagram showing one example of a function configuration of a main part of the photoelectric sensor 100 in FIG. 1. FIG. 4 shows a light emission control section 30, a capturing control section 31, a binarization processing section 32, a waveform detection section 33, a waveform integration section 34, a peak detection section 35, and a workpiece discrimination section 36. Note that the blocks 30 to 35 are realized by the distance measurement section 22, and the workpiece discrimination section 36 is realized by the main control section 23.

Based on a workpiece detection signal from the main control section 23, the light emission control section 30 generates the light emitting signal P. The workpiece detection signal is a control signal that instructs detection of the workpiece, and the light emission control section 30 sequentially generates two or more light emitting signals P with respect to one-time detection of the workpiece. When the repeated number of times of the light emitting signal P is Ns, detection light for Ns pulses is sequentially emitted from the light emitting element 20 for one-time distance measurement. For example, detection light for 64 pulses is generated with respect to one-time distance measurement.

The capturing control section 31 generates a capturing signal S based on the light emitting signal P, and outputs the generated capturing signal S to the waveform detection section 33. The capturing signal S is a signal that gives capturing timing of capturing a light receiving waveform, and is generated as a signal corresponding to the light emitting timing. For example, the capturing signal S is generated by delaying the light emitting signal P. The time difference between the light emitting timing and the capturing timing is previously set as a capturing delay Td, and the capturing control section 31 can be realized as a delay circuit which delays the light emitting signal P only by the capturing delay Td. In this example, it is assumed that the capturing delay Td is 50 ns.

The binarization processing section 32 compares the light receiving signal R1 outputted from the light receiving element 21 with a previously set binarization threshold Vd, and generates a binarized light receiving signal R2 that indicates a binarized light receiving amount.

The waveform detection section 33 is a sampling part which acquires waveform data Ws based on the capturing signal S from the capturing control section 31. The waveform data Ws is data indicating a temporal change of a light receiving amount for fixed time immediately before the capturing timing, and is constituted by a large number of binarized light receiving amounts. A time width of the acquired waveform data Ws is previously set as capturing time Tw. For example, when a sampling period is 100 ps and the number of sampling is 600, the capturing time Tw is 60 ns. That is, the waveform data Ws is data obtained by cutting out waveform data of the binarized light receiving signal R2 on a time axis taking the light emitting timing as a reference by use of a temporal window specified by the capturing delay Td and the capturing time Tw.

The waveform integration section 34 integrates two or more pieces of waveform data Ws acquired by the waveform detection section 33 and generates integrated waveform data Wm. The waveform detection section 33 acquires Ns-pieces of waveform data Ws with respect to one-time distance measurement. These pieces of waveform data Ws are integrated by the waveform integration section 34 such that light emitting timing of each thereof match, to generate one integrated waveform data Wm. That is, in this integrated waveform data Wm, a maximum value of amplitude data is Ns.

Integration herein means arithmetic processing of adding binary data constituting two pieces of waveform data Ws to each other at every corresponding time. A sequence of the binary data constituting the pieces of waveform data Ws which are generated by the waveform detection section 33 corresponds to a time with the light emitting timing taken as a reference. For this reason, the waveform integration section 34 performs processing of adding binary data to each other, whose sequences in the respective two pieces of waveform data Ws match.

The peak detection section 35 detects a peak of the integrated waveform data Wm and obtains a distance to the reflection surface. By detecting the peak of the integrated waveform data Wm, a pulse of the reflected light can be detected. A known technique can be used for detection of the peak. For example, the integrated waveform data Wm is compared with a previously set peak threshold Vp, and it can be determined that the peak exists in a position where the peak threshold Vp is exceeded for the first time. Since the light receiving timing of the reflected light is found by such detection of the peak, it is possible to obtain transmission time of the detection light which corresponds to a reciprocal distance to the reflection surface. That is, the distance to the reflection surface is obtained as a time difference between the light emitting timing and the light receiving timing.

The workpiece discrimination section 36 compares the distance to the reflection surface, obtained by the peak detection section 35, with the determination threshold Vj, to thereby discriminate the presence or absence of the workpiece. The determination threshold Vj is previously specified by the user and stored in the data storage section 24.

Figure 5:
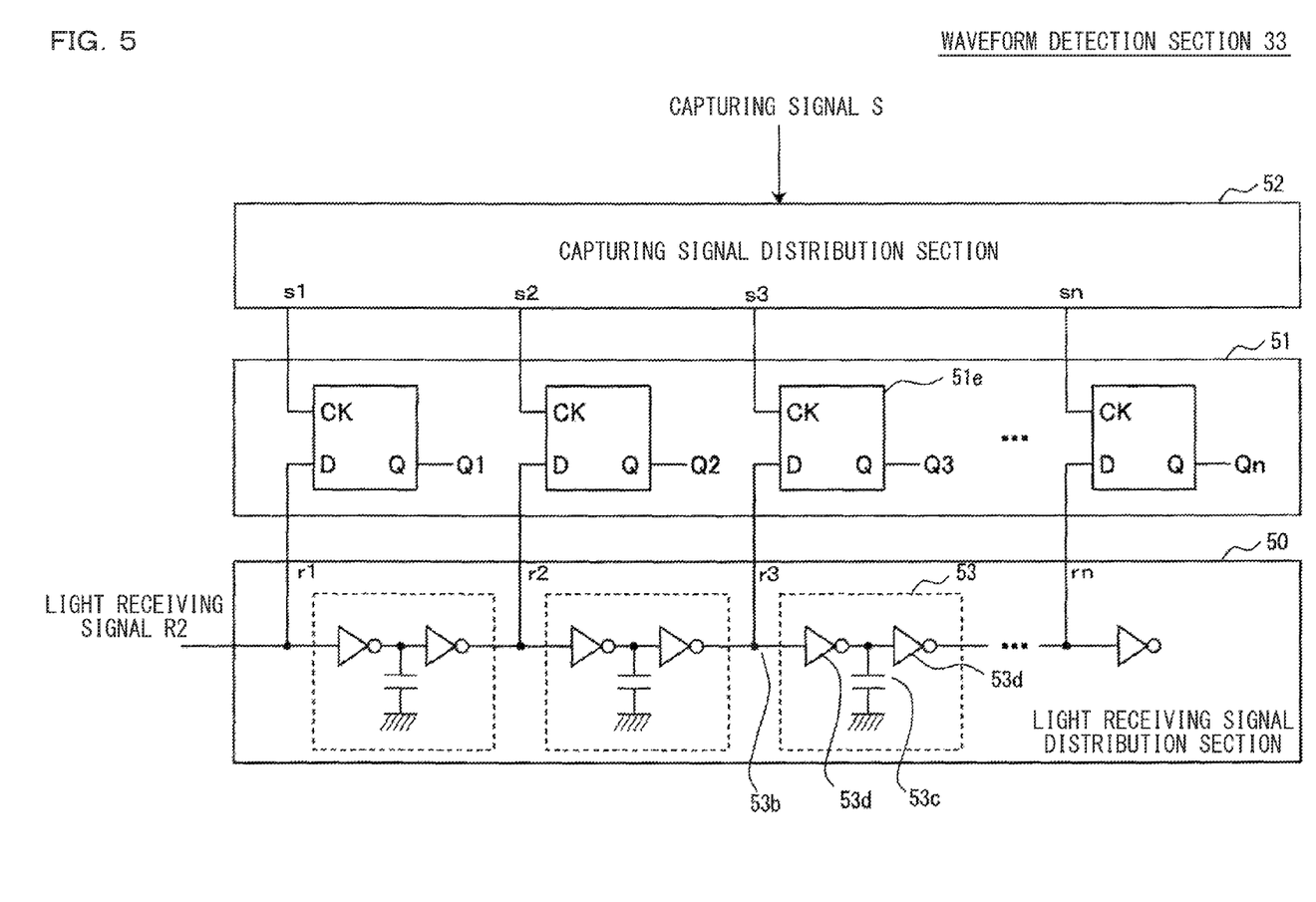
FIG. 5 is a diagram showing one example of a detailed configuration of a waveform detection section 33 in FIG. 4.

FIG. 5 is a diagram showing one example of a detailed configuration of the waveform detection section 33 in FIG. 4. The waveform detection section 33 is configured by a waveform capturing section 51 including a large number of storage elements 51e, a light receiving signal distribution section 50 which supplies the binarized light receiving signal R2 to each storage element 51e, and a capturing signal distribution section 52 which supplies the capturing signal S to each storage element 51e.

The light receiving signal distribution section 50 is a circuit which distributes the binarized light receiving signal R2 from the binarization processing section 32, and generates a large number of binarized light receiving signals r1 to rn with delay time different from each other. The generated binarized light receiving signals r1 to rn are respectively inputted into n-storage elements 51e constituting the waveform capturing section 51.

The light receiving signal distribution section 50 according to the present embodiment includes a delay line formed by connecting a large number of delay circuits 53 in series, and the binarized light receiving signal R2 is inputted into an input port of the delay line. Further, a branch point 53b is provided between each delay circuit 53, and outputs of the respective delay circuits 53 are inputted, as binarized light receiving signals r1 to rn after the distribution, into the respective storage elements 51e. The delay circuit 53 is a delay part which delays a one-bit logic signal for fixed time, and has extremely short delay time of approximately 100 ps, for example. Therefore, with the delay time of each delay circuit 53 taken as a minimum unit, waveform data of the binarized light receiving signal R2 having a time length corresponding to a total of the delay time is formed on the delay line, and outputted as n-binarized light receiving signals r1 to rn to the waveform capturing section 51.

The waveform capturing section 51 is provided with the large number of storage elements 51e, and captures the waveform data of the binarized light receiving signal R2 based on the capturing signal S. The respective storage elements 51e capture the binarized light receiving signals r1 to rn from the light receiving signal distribution section 50 based on capturing signals s1 to sn from the capturing signal distribution section 52, to thereby generate the waveform data Ws indicating a temporal change of the binarized light receiving signal R2. For example, a flip-flop or a latch circuit can be used for the storage element 51e. FIG. 5 shows an example of a D-type flip-flop in which a D input is captured and held at rising timing of a CK input, and its value is outputted as a Q output.

In the waveform capturing section 51 according to the present embodiment, the respective storage elements 51e are associated with the respective delay circuits 53 in the light receiving signal distribution section 50. Therefore, when the capturing signals s1 to sn after the distribution are completely synthesized, the binarized light receiving signals r1 to rn with delay amounts different from each other are simultaneously captured by the respective storage elements 51e, to generate the waveform data Ws. That is, the timing of supply of the capturing signal S and the binarized light receiving signal R2 to the respective storage elements 51e are relatively delayed, to thereby generate the waveform data Ws. It means that in this case, sampling processing of the binarized light receiving signal R2 is performed in which delay time of one delay circuit 53 is taken as a sampling period and the number of delay circuits 53 is taken as the number of sampling.

The capturing signal distribution section 52 is a circuit which distributes the capturing signal S from the capturing control section 31 and generates a large number of capturing signals s1 to sn synchronized with each other. The generated capturing signals s1 to sn are respectively inputted into the n-storage elements 51e constituting the waveform capturing section 51.

The delay circuit 53 is configured by two delay elements 53d connected in series and a capacitance element 53c which adds a capacitance to a connection point of these delay elements 53d. An output signal of the pre-stage delay circuit 53 is inputted into the pre-stage delay element 53d, and the output terminal of the pre-stage delay element 53d is connected with the post-stage delay element 53d and the capacitance element 53c. Further, an output terminal of the post-stage delay element 53d is connected with the post-stage delay circuit 53 and the storage element 51e via a branch point 53b.

An inverter (NOT gate) is used for each delay element 53d. Generally, an output characteristic of the inverter at the time of rising is different from that at the time of falling, and delay time of the inverter varies depending on a load capacitance. For this reason, when two inverters having the same characteristics are connected in series and load capacitances of these inverters can be matched, a rising characteristic and a falling characteristic of the delay circuit 53 can be matched. Therefore, the capacitance element 53c substantially matched to an input capacitance of the storage element 51e is connected to the output terminal of the pre-stage delay element 53d, to match the load capacitances of the two inverters constituting the delay circuit 53.

Figure 6:
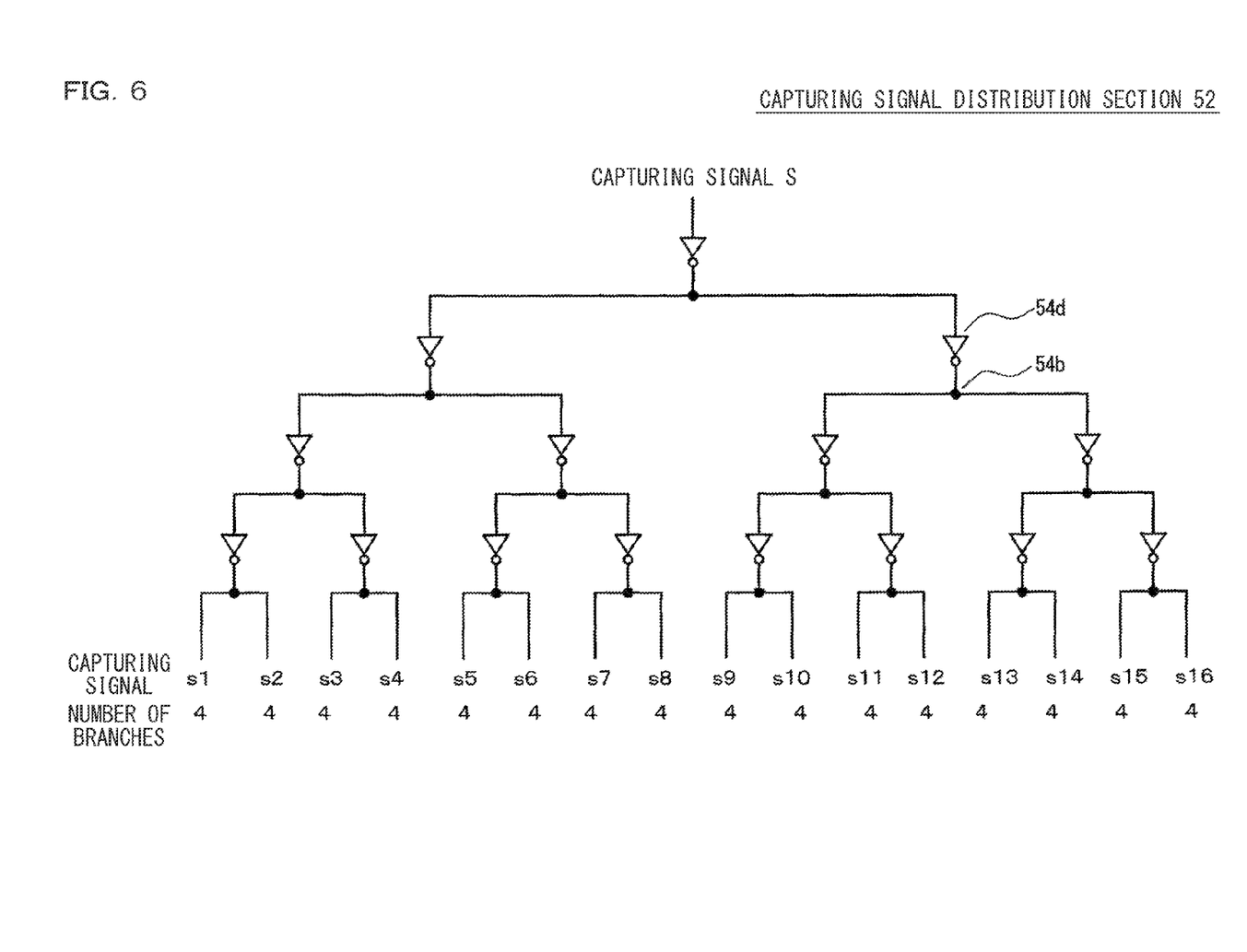
FIG. 6 is a diagram showing one configuration example of a capturing signal distribution section 52.

FIG. 6 is a diagram showing one configuration example of the capturing signal distribution section 52, and shows an example of the case where the capturing signal S is distributed to 16 capturing signals s1 to s16. The capturing signal S is supplied to the large number of storage elements 51e constituting the waveform capturing section 51 via the capturing signal distribution section 52. Here, a description will be given of an example where the capturing signal S is distributed to the 16 capturing signals s1 to s16 so as to be supplied to 16 storage elements 51e.

The capturing signal distribution section 52 is provided with a large number of branch points 54b each having two branch destinations, and a large number of amplification elements 54d provided at the respective branch points 54b. Further, there has been adopted a circuit configuration having a symmetrical tree structure such that the capturing signals s1 to s16 after the distribution are generated via the same number of branch points 54b as much as possible.

In FIG. 6, the capturing signal S is inputted from the upper side, and via the bilaterally symmetrical tree-shaped circuit, the 16 capturing signals s1 to s16 arrayed in a lateral direction are outputted downward. In this case, any of the capturing signals s1 to s16 after the distribution is generated via the same number (four) of branch points 54b.

Generally, in a circuit element, delay time increases as a load capacitance increases. Therefore, when average delay time of the capturing signals s1 to sn with respect to the capturing signal S is to be made minimal, it is necessary to adopt a circuit configuration in which the number of fan-out of each amplification element 54d is reduced and the number of amplification elements 54d through which the capturing signals s1 to sn respectively pass is also reduced.

In order to reduce the number of fan-out of the amplification element 54d, the amplification element 54d is desirably arranged with respect to each branch point 54b to reduce the number of branch destinations at each branch point 54b, and the number of branch destinations is preferably two. Further, in order to reduce the number of amplification elements 54d through which the capturing signals s1 to sn respectively pass, the symmetrical tree-shaped circuit is preferably adopted such that the capturing signals s1 to sn respectively pass through the same number of branch points 54b as much as possible. Therefore, in the case of n=16, when the average delay time of the capturing signals s1 to s16 with respect to the capturing signal S is to be made minimal, the tree circuit shown in FIG. 6 is preferably adopted.

Figure 7:
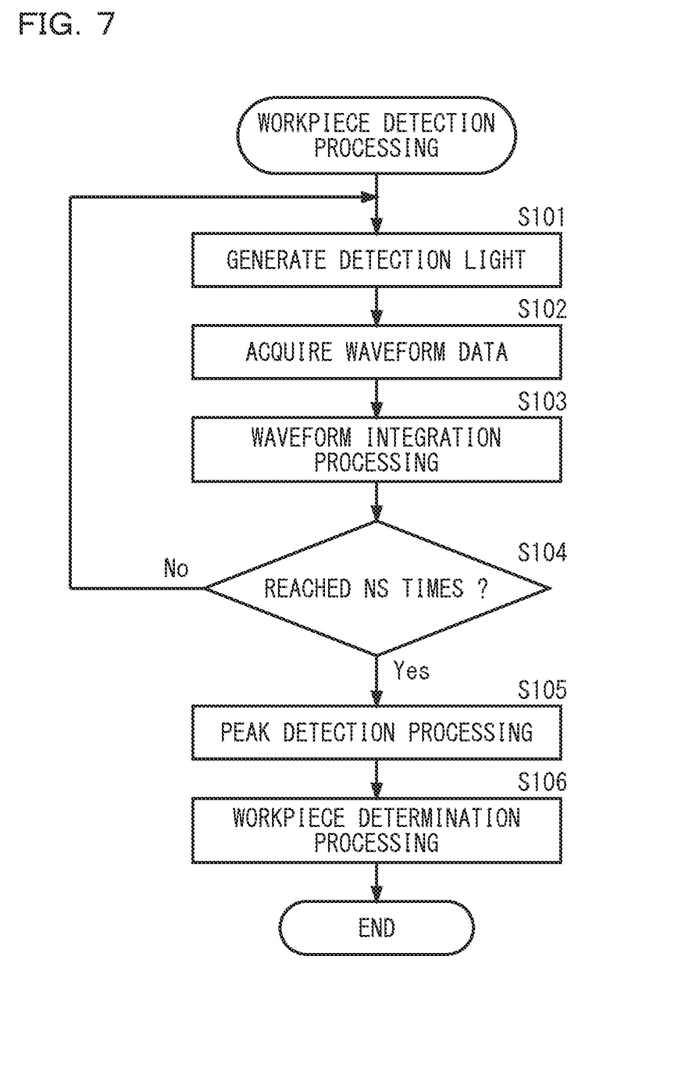
FIG. 7 is a flowchart showing one example of workpiece detection processing by the photoelectric sensor 100.

Steps S101 to S106 in FIG. 7 are a flowchart showing one example of workpiece detection processing by the photoelectric sensor 100. This workpiece detection processing is started when detection of the workpiece is instructed.

First, the light emitting element 20 generates detection light (Step S101). When the workpiece detection processing is started, the light emission control section 30 generates a light emitting signal P, and based on this light emitting signal P, the light emitting element 20 generates pulse-like detection light. This detection light is emitted via the light projection window 11, and is reflected by the workpiece, a wall of a background, or the like. Part of this reflected light is incident on the light receiving element 21 via the light receiving window 12, and a binarized light receiving signal R2 obtained by binarizing an amount of the received light is inputted into the waveform detection section 33.

Next, waveform data Ws is acquired (Step S102). When a predetermined capturing delay Td elapses from light emitting timing of generation of the light emitting signal P, a capturing signal S is generated by the capturing control section 31 and is inputted into the waveform detection section 33. Based on this capturing signal S, the waveform capturing section 51 of the waveform detection section 33 captures waveform data Ws of the binarized light receiving signal R2.

Next, integration processing is performed on the captured waveform data Ws (Step S103). The integration processing is processing of adding binary data of two pieces of waveform data Ws that correspond to each other on a time axis where the light emitting timing are matched. The waveform data Ws captured for the first time becomes integrated waveform data Wm as it is. The waveform data Ws captured for the second time or thereafter is added to the previously obtained integrated waveform data Wm, to obtain new integrated waveform data Wm.

Upon input of a workpiece detection signal, the light emission control section 30 repeatedly generates the light emitting signal P until the number of generation reaches a previously set repeated number of times Ns. That is, the processing of Steps S101 to S103 is repeated Ns times (Step S104).

When integrated waveform data Wm obtained by integrating Ns-pieces of waveform data Ws is obtained, peak detection processing is performed based on the integrated waveform data Wm (Step S105). The peak detection processing is processing of detecting a peak of the integrated waveform data Wm, and a pulse of the reflected light included in the integrated waveform data Wm is detected as the peak. With a position of the peak showing light receiving timing, it is possible to obtain a distance to the reflection surface by detecting the peak.

When the distance to the reflection surface is obtained, workpiece determination processing is performed (Step S106). The workpiece determination processing is performed by comparing the distance to the reflection surface with a determination threshold Tj. For example, when the distance to the reflection surface is not greater than the determination threshold Vj, it can be determined that the workpiece is present, and otherwise, it can be determined that the workpiece is not present.

Figure 8A:
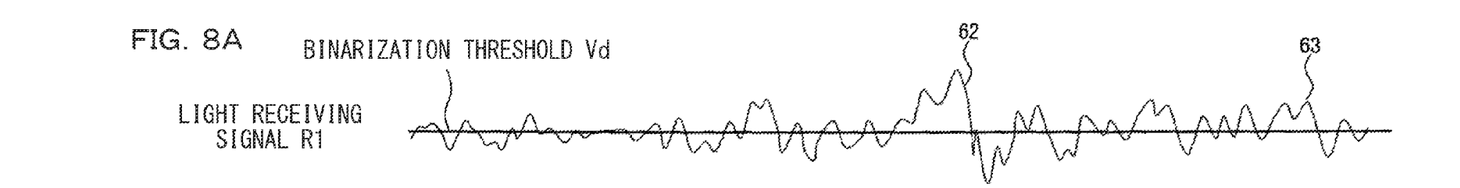
FIGS. 8A to 8C are timing charts showing one example of an operation of the photoelectric sensor 100.
Figure 8B:
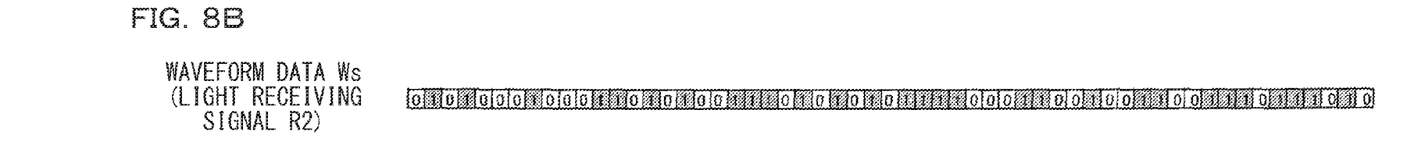
Figure 8C:
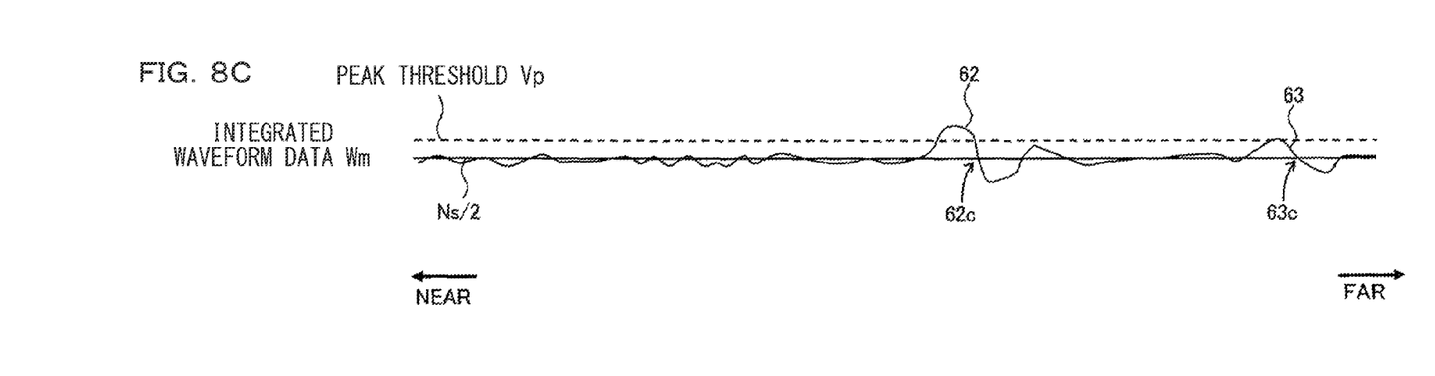

FIGS. 8A to 8C are timing charts showing one example of an operation of the photoelectric sensor 100. FIG. 8A shows a temporal change of the light receiving signal R1 outputted from the light receiving element 21, FIG. 8B shows the waveform data Ws acquired by the waveform detection section 33, and FIG. 8C shows the integrated waveform data Wm obtained by the waveform integration section 34. Further, FIGS. 8A to 8C are shown such that the light receiving time becomes earlier toward left (on the nearer side), and the light receiving time becomes later toward right (on the farther side).

The light receiving signal R1 in FIG. 8A includes a workpiece reflected component 62 and a wall-surface reflected component 63 as significant components. The workpiece reflected component 62 is a component corresponding to reflected light on the workpiece 101, and the wall-surface reflected component 63 is a component corresponding to reflected light on the wall surface 102. Further, the light receiving signal R1 includes not only the significant components 62, 63 but also many noises, and even when the peak detection processing is performed on the waveform data of the light receiving signal R1, it is not easy to extract the workpiece reflected component 62 and the wall-surface reflected component 63.

The waveform data Ws in FIG. 8B is constituted by a large number of binarized light receiving amounts, and shows a temporal change of the binarized light receiving signal R2. With the light receiving amounts binarized, the significant components 62, 63 and noise components are mixed in an indistinguishable state.

The waveform data Wm in FIG. 8C is waveform data obtained by integrating Ns-pieces of waveform data Ws, and the noise components have been reduced and the significant components 62, 63 have been emphasized. When the pieces of waveform data Ws are integrated, amplitude of each noise generated at random comes closer to Ns/2 with increase in the integrated number Ns. In contrast, amplitude of each of the significant components 62, 63 is further emphasized with increase in the integrated number Ns and gets farther from Ns/2. For this reason, when the integrated number Ns is sufficiently large, the significant components 62, 63 can be easily extracted using the integrated waveform data Wm.

Discrimination of the workpiece reflected component 62 is performed by the peak detection processing. That is, the significant components 62, 63 are detected by comparing the integrated waveform data Wm with the peak threshold Vp. Out of these components, the workpiece reflected component 62 is extracted as a first peak.

Subsequently, the distance to the reflection surface which corresponds to the workpiece reflected component 62 is obtained. Since a position on the integrated waveform data Wm corresponds to the time with the light emitting timing taken as the reference, it is possible to obtain the distance to the reflection surface based on a position on the integrated waveform data Wm where the workpiece reflected component 62 has been extracted. In FIG. 8C, a point where a falling edge of the workpiece reflected component 62 intersects with the reference level Ns/2 is obtained as a reference cross point 62c, and the distance to the reflection surface is obtained based on the position of the reference cross point 62c. Note that a rising edge may be used in place of the falling edge, or the reference level may be other than Ns/2.

In the photoelectric sensor 100 according to the present embodiment, the binarization processing section 32 binarizes the light receiving signal R1 of the light receiving element 21, and the waveform detection section 33 detects the waveform data Ws showing the temporal change of the binarized light receiving signal R2. Therefore, as compared to the case of sampling the light receiving signal R1 as multiple value data, it is possible to significantly reduce a circuit scale and realize faster sampling. Moreover, it is possible to significantly suppress heat generation at the time of sampling, so as to reduce or omit heat radiation processing. Hence, it is possible to reduce a size of the photoelectric sensor 100.

Further, in the photoelectric sensor 100 according to the present embodiment, the light emitting element 20 repeatedly generates detection light, the waveform detection section 33 generates two or more pieces of waveform data Ws, and the waveform integration section 34 matches light emitting timing of the light emitting element 20 and generates integrated waveform data Wm obtained by integrating the pieces of waveform data Ws. By such integration processing, it is possible to reduce an influence by noise generated at random and generate integrated waveform data Wm in which the reflected light component is emphasized, so as to facilitate detection of the reflected light.

That is, sampling the binarized light receiving signal R2 and generating the waveform data Ws can lead to sampling of the light receiving amount at a high speed without significantly increasing the circuit scale. Further, integrating two or more pieces of waveform data Ws can facilitate detection of the reflected light. Moreover, reducing an influence by noise with the high-speed sampling can lead to improvement in reliability of detection of the workpiece.

Further, in the photoelectric sensor 100 according to the present embodiment, the peak detection section 35 compares the integrated waveform data Wm with the peak threshold Vp and detects the peak, to thereby detect the reflected light component and obtain the distance to the reflection surface. Moreover, the workpiece discrimination section 36 compares the obtained distance with the determination threshold Vj, and discriminates the presence or absence of the workpiece. Hence it is possible to accurately discriminate the presence or absence of the workpiece, so as to provide a highly reliable photoelectric sensor.

Further, the photoelectric sensor 100 according to the present embodiment includes the light receiving signal distribution section 50 which includes the large number of delay circuits 53 connected in series, and the capturing control section 31 which generates the capturing signal S based on the light emitting timing of the light emitting element 20. The binarized light receiving signal R2 is inputted into the delay line of the light receiving signal distribution section 50, and based on the capturing signal S, the waveform capturing section 51 captures an output of each delay circuit 53, to thereby generate the waveform data Ws. For this reason, it is possible to perform sampling processing of the binarized light receiving signal R2 in which the delay time of one delay circuit 53 is taken as a sampling period and the number of delay circuits 53 is taken as the number of sampling. Hence, it is possible to acquire the waveform data Ws sampled in an extremely short period on the level of the delay time of a logic element, so as to accurately obtain the distance to the reflection surface.

Moreover, in the photoelectric sensor 100 according to the present embodiment, the waveform capturing section 51 includes the large number of storage elements 51e each corresponding to the delay circuit 53, and the delay circuit 53 is provided with two delay elements 53d connected in series and the capacitance element 53c between the delay elements 53d, the capacitance element 53c adding a capacitance substantially equal to the input capacitance of the storage element 51e. Hence, it is possible to substantially match load capacitances of the two delay elements 53d and substantially match a rising characteristic and a falling characteristic of the delay circuit, so as to accurately acquire the waveform data Ws.

Second Embodiment

In the first embodiment, the description has been given of the example of the case where the capturing signal distribution section 52 is made up of the symmetrical tree circuit and the average delay time of the capturing signals s1 to sn is minimized. In contrast, in the present embodiment, a description will be given of a case where the capturing signal distribution section 52 is made up of an asymmetrical tree circuit to prevent inversion of sampling times from occurring.

Figure 9:
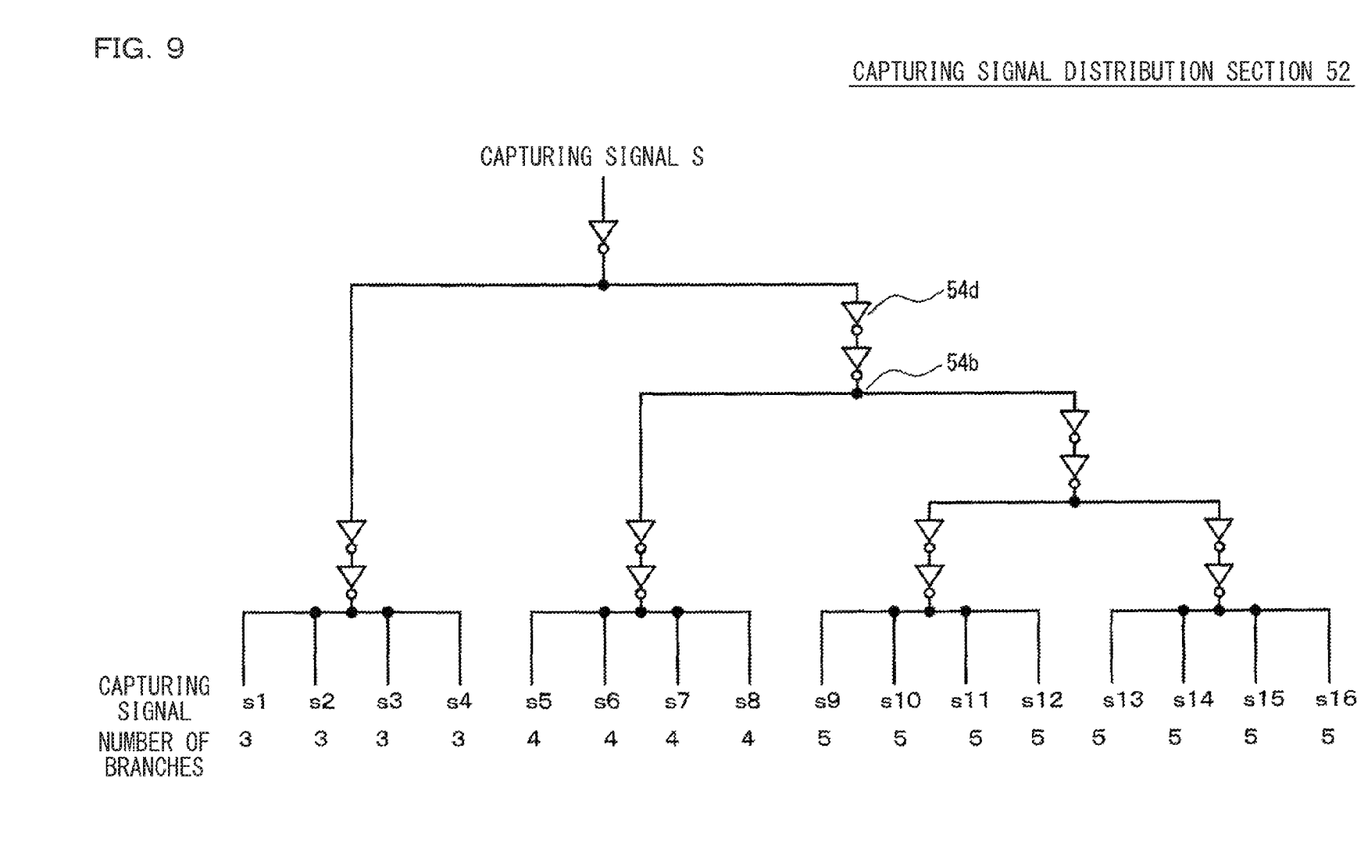
FIG. 9 is a diagram showing one configuration example of the capturing signal distribution section 52 according to a second embodiment of the present invention.

FIG. 9 is a diagram showing one configuration example of the capturing signal distribution section 52 according to the second embodiment of the present invention, showing an example of the case where the capturing signal S is distributed to 16 capturing signals s1 to s16, as in the case of FIG. 6. This capturing signal distribution section 52 is provided with a large number of branch points 54b and a large number of amplification elements 54d, but differently from the case of FIG. 6, it is made up of an asymmetrical tree-shaped circuit.

The capturing signals s1 to s16 after the distribution are capturing signals to be inputted into the respective storage elements 51e in the waveform capturing section 51, and the respective storage elements 51e are associated with the respective delay circuits 53 in the light receiving signal distribution section 50. That is, the capturing signals s1 to s16 after the distribution are associated with sampling times of the binarized light receiving signal R2. For this reason, when the capturing signals s1 to s16 are not completely synthesized, an error occurs in sampling times.

An error occurs in delay time of the capturing signals s1 to s16 with respect to the capturing signal S due to variations in characteristic or variations in wiring capacitance among each amplification element 54d even when the number of branches through which each capturing signal passes is the same. Then, when an error that occurs between capturing signals si and s(i+1) corresponding to adjacent sampling times exceeds the delay time of the delay circuit 53, missing data occurs in the waveform data Ws. For example, although capturing signals S8 and S9 in FIG. 6 correspond to adjacent sampling times, in the capturing signal distribution section 52, they are divided at the first branch point 54b and generated via three amplification elements 54d different from each other, and hence inversion tends to occur in sampling times, to which the capturing signals S8, S9 correspond.

Therefore, the capturing signal distribution section 52 according to the present embodiment is configured to prevent the inversion of the sampling times while permitting an increase in average delay time of the capturing signals s1 to s16 to a certain degree. Specifically, each of the capturing signals s1 to s16 is generated such that the number of branches to pass through monotonously decreases as the corresponding sampling time becomes later. That is, the capturing signal distribution section 52 is designed such that, as for the delay time of the capturing signals s1 to s16 after the distribution of the capturing signal S, the delay time of the capturing signal corresponding to an earlier sampling time (on the nearer side) becomes longer, to thereby prevent occurrence of missing data in the waveform data Ws.

In FIG. 9, the capturing signal S is inputted from the upper side, and via the bilaterally asymmetrical tree-shaped circuit, the 16 capturing signals s1 to s16 arranged in a lateral direction are outputted downward. The number of branches through which each of the capturing signals s1 to s16 passes is not the same. The number of branches for the capturing signals s1 to s4 is three, the number of branches for the capturing signals s5 to s8 is four, and the number of branches for the capturing signals s9 to s16 is five. That is, it is designed such that, as for the capturing signals s1 to s16 after the distribution, the corresponding sampling time of the signal with a smaller number on the more left side is later, and hence the number of branches through which the signal passes becomes smaller and a delay amount with respect to the capturing signal S becomes smaller. Further, it is designed such that the sampling time of the signal with a larger number on the more right side is earlier, and hence the number of branches through which the signal passes becomes larger and a delay amount with respect to the capturing signal S becomes larger.

The photoelectric sensor 100 according to the present embodiment includes the capturing signal distribution section 52 which distributes the capturing signal S to the large number of storage elements 51e synchronized with each other, and in the capturing signal distribution section 52, the number of branches through which each of the capturing signals s1 to sn passes monotonously increases as the light receiving time of the binarized light receiving signal R2 captured by the storage elements 51e inputted with each of the capturing signals s1 to s16 is earlier. For this reason, a delay inside the capturing signal distribution section 52 can prevent occurrence of missing data in the waveform data Ws constituted by the binarized light receiving signal R2 captured into the storage element 51e.

Third Embodiment

In the first embodiment, the description has been given of the example of the case where the light receiving signal distribution section 50 is provided with the delay circuit 53 and delays the binarized light receiving signal R2, to thereby acquire the waveform data Ws. In contrast, in the present embodiment, a description will be given of a case where the capturing signal distribution section 52 is provided with the delay circuit 53 and delays the capturing signal S, to thereby acquire the waveform data Ws.

Figure 10:
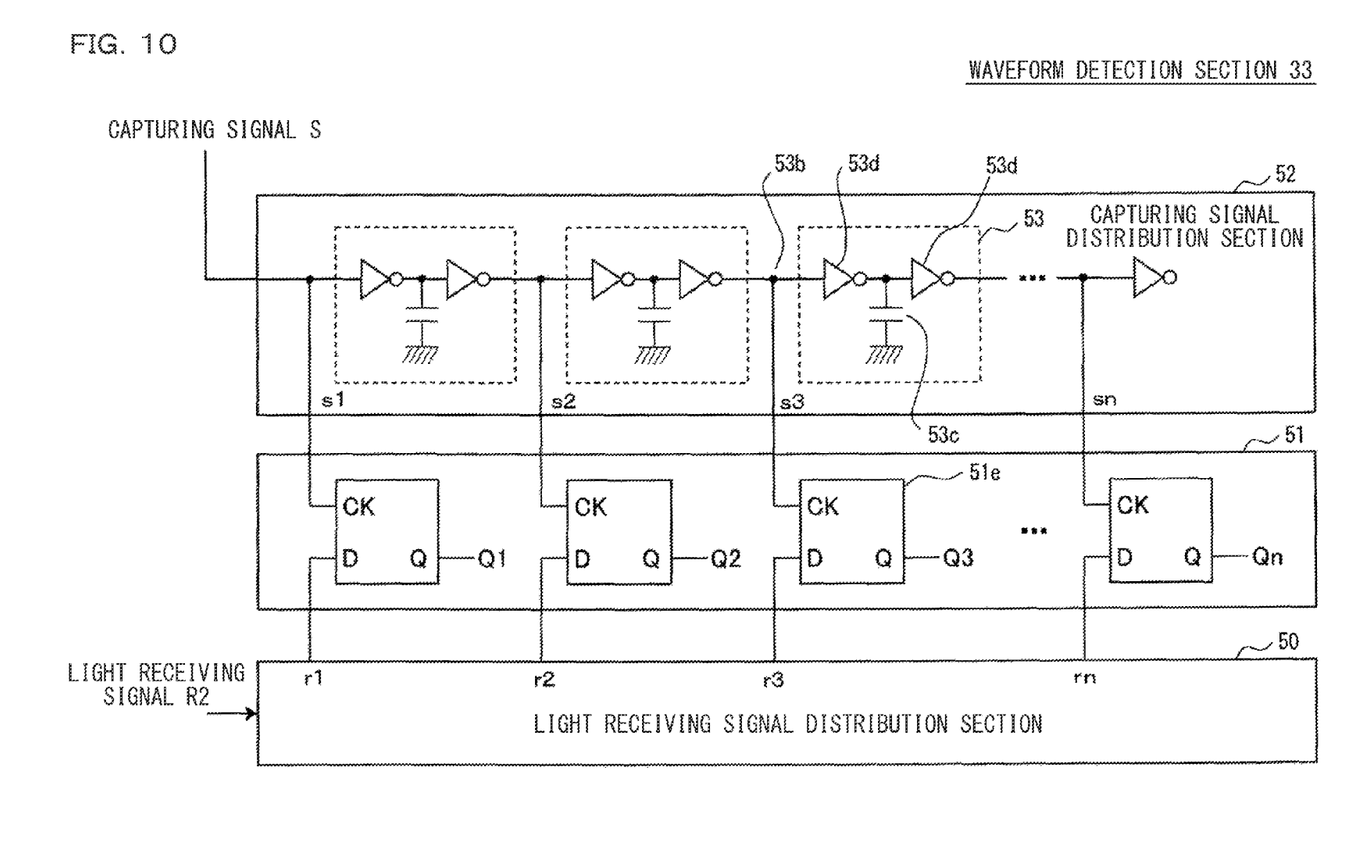
FIG. 10 is a diagram showing one configuration example of the waveform detection section 33 according to a third embodiment of the present invention.

FIG. 10 is a diagram showing one configuration example of the waveform detection section 33 according to a third embodiment of the present invention. This waveform detection section 33 is also configured by the waveform capturing section 51, the light receiving signal distribution section 50, and the capturing signal distribution section 52, but it is different as compared to the waveform detection section 33 in FIG. 5 (the first embodiment) in that the light receiving signal distribution section 50 is made up of a tree circuit and the capturing signal distribution section 52 is made up of a delay line. That is, it corresponds to a configuration in which the light receiving signal distribution section 50 and the capturing signal distribution section 52 in FIG. 5 are replaced with each other.

The light receiving signal distribution section 50 is a circuit which distributes the binarized light receiving signal R2 from the binarization processing section 32, and generates a large number of binarized light receiving signals r1 to rn synchronized with each other. The generated binarized light receiving signals r1 to rn are respectively inputted into n-storage elements 51e constituting the waveform capturing section 51.

The capturing signal distribution section 52 is a circuit which distributes the capturing signal S from the capturing control section 31 and generates a large number of capturing signals s1 to sn different from each other. The generated capturing signals s1 to sn are respectively inputted into the n-storage elements 51e constituting the waveform capturing section 51.

The capturing signal distribution section 52 according to the present embodiment includes a delay line formed by connecting a large number of delay circuits 53 in series, and the capturing signal S is inputted into an input port of the delay line. Further, a branch point 53b is provided between each delay circuit 53, and outputs of the respective delay circuits 53 are inputted, as capturing signals s1 to sn after the distribution, into the respective storage elements 51e. That is, the configuration of the delay line is similar to the delay line of the light receiving signal distribution section 50 in FIG. 5. For this reason, with the delay time of each delay circuit 53 taken as a minimum unit, a large number of capturing signals s1 to sn with delay amounts different from each other are generated.

The waveform capturing section 51 has a similar configuration to that in the case of FIG. 5, but is different in that each storage element 51e is associated with each delay circuit 53 in the capturing signal distribution section 52. For this reason, when the binarized light receiving signals r1 to rn after the distribution are completely synthesized, the binarized light receiving signal R2 is sequentially captured into each storage element 51e with a time difference corresponding to the delay time of the delay circuit 53. That is, the timing of supply of the capturing signal S and the binarized light receiving signal R2 to the respective storage elements 51e are relatively delayed, to thereby generate the waveform data Ws. As a result, as in the case of the first embodiment, sampling processing of the binarized light receiving signal R2 is performed in which the delay time of one delay circuit 53 is taken as a sampling period and the number of delay circuits 53 is taken as the number of sampling.

Figure 11:
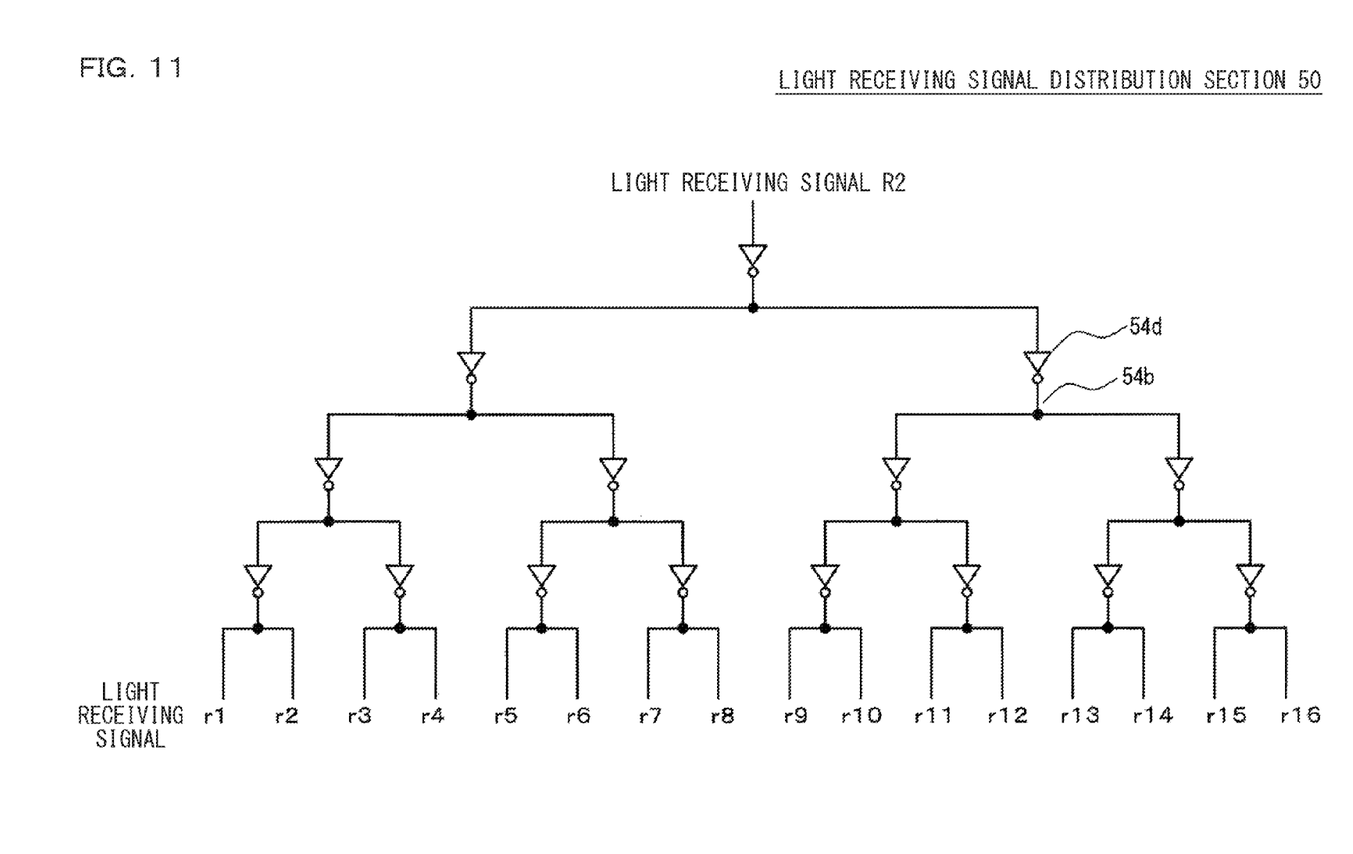
FIG. 11 is a diagram showing one configuration example of a light receiving signal distribution section 50.

FIG. 11 is a diagram showing one configuration example of the light receiving signal distribution section 50, showing an example of the case where the binarized light receiving signal R2 is distributed to 16 binarized light receiving signals r1 to r16. The binarized light receiving signal R2 is supplied to a large number of storage elements 51e constituting the waveform capturing section 51 via the light receiving signal distribution section 50. Herein an example is shown in which the binarized light receiving signal R2 is distributed to the 16 binarized light receiving signals r1 to r16 so as to be supplied to 16 storage elements 51e. This light receiving signal distribution section 50 has a similar configuration to that of the capturing signal distribution section 52 in FIG. 6 (the first embodiment), but is different in that the binarized light receiving signal R2 is inputted in place of the capturing signal S and the binarized light receiving signals r1 to rn are outputted in place of the capturing signals s1 to sn.

The waveform detection section 33 according to the present embodiment is configured such that the configurations of the light receiving signal distribution section 50 and the capturing signal distribution section 52 are replaced with each other, the light receiving signal distribution section 50 is made up of a tree circuit, the capturing signal distribution section 52 is made up of a delay line, and the capturing signal S is delayed in place of the binarized light receiving signal R2. Even in the case of adopting such a configuration, it is possible to generate the waveform data Ws as in the case of the first embodiment.

What is claimed is:
1. A photoelectric sensor comprising:
 a light emitting element which repeatedly generates detection light;
 a light receiving element which receives reflected light of the detection light and generates a light receiving signal indicating a light receiving amount;
 a binarization processing section which binarizes the light receiving signal from the light receiving element;
 a capturing control circuit which generates a capturing signal corresponding to light emitting timing of the light emitting element;
 a waveform capturing section which has a large number of storage elements, each of the storage elements storing the binarized light receiving signal in accordance with the capturing signal;
 a capturing signal distribution section which has a branch circuit for supplying the capturing signal to each of the storage element;
 a light receiving signal distribution section which has a branch circuit for supplying the binarized light receiving signal to each of the storage elements;
 a delay circuit which is provided in at least one of the capturing signal distribution section and the light receiving signal distribution section, and relatively delays timing of supply of the capturing signal and the binarized light receiving signal to each of the storage elements such that the binarized light receiving signal is stored into the waveform capturing section as waveform data indicating a temporal change;

a waveform integration part which matches light emitting timing of the light receiving element to integrate two or more pieces of the waveform data and generates integrated waveform data; and a workpiece discrimination part which discriminates presence or absence of a workpiece based on the integrated waveform data.

2. The photoelectric sensor according to claim 1, further comprising a peak detection part which detects a peak of the integrated waveform data and obtains a distance to a reflection surface of the reflected light, wherein the workpiece discrimination part compares the distance with a determination threshold and discriminates the presence or absence of the workpiece.

3. The photoelectric sensor according to claim 1, wherein the light receiving signal distribution section is provided with a delay line which includes a large number of the delay circuits connected in series, and into which the binarized light receiving signal is inputted.

4. The photoelectric sensor according to claim 3, wherein the delay circuit has a first delay element and a second delay element which are connected in series, and a capacitance element, an output terminal of the first delay element is connected to the second delay element and the capacitance element, an output terminal of the second delay element is connected to the storage element and the post-stage delay circuit, and the capacitance element has a capacitance substantially equal to an input capacitance of the storage element.

5. The photoelectric sensor according to claim 4, wherein in the capturing signal distribution section, the number of branches, through which the capturing signal passes before being inputted into the storage element, monotonously increases as a light receiving time of the light receiving amount captured by the storage element becomes earlier.

* * * * *